United States Patent
Nagaralu et al.

(10) Patent No.: US 11,374,888 B2
(45) Date of Patent: Jun. 28, 2022

(54) USER-DEFINED NOTIFICATION TEMPLATES

(71) Applicant: MICROSOFT TECHNOLOGY LICENSING, LLC, Redmond, WA (US)

(72) Inventors: Sree Hari Nagaralu, Hyderabad (IN); Venkata Sai Ravali Busetty, Hyderabad (IN); Ranganath Kondapally, Hyderabad (IN); Karthikeyan Raman, Hyderabad (IN); Naveen Kumar Sethia, Hyderabad (IN); Pavan Kumar Dasari, Hyderabad (IN); Vijayendra Gopalrao Vasu, Hyderabad (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 663 days.

(21) Appl. No.: 14/865,346

(22) Filed: Sep. 25, 2015

(65) Prior Publication Data

US 2017/0093766 A1     Mar. 30, 2017

(51) Int. Cl.
*G06F 15/16* (2006.01)
*H04L 51/066* (2022.01)
(Continued)

(52) U.S. Cl.
CPC ......... *H04L 51/066* (2013.01); *G06Q 10/107* (2013.01); *H04L 41/0686* (2013.01)

(58) Field of Classification Search
CPC ... H04L 67/30; H04L 41/0686; H04L 51/066; H04L 51/24; H04L 12/1895; H04L 67/26
See application file for complete search history.

(56) References Cited

U.S. PATENT DOCUMENTS

| 7,366,711 B1 | 4/2008 | McKeown et al. |
| 7,788,576 B1 | 8/2010 | Chen et al. |

(Continued)

FOREIGN PATENT DOCUMENTS

WO     2000049517 A2     8/2000

OTHER PUBLICATIONS

"Android Developers—API Guides—User Interface—Notifications", Retrieved from <<https://web.archive.org/web/20150919210910/http://developer.android.com/guide/topics/ui/notifiers/notifications.html>>, Sep. 9, 2015, 14 Pages.
(Continued)

*Primary Examiner* — Suraj M Joshi
*Assistant Examiner* — Ayele F Woldemariam
(74) *Attorney, Agent, or Firm* — Calfee, Halter & Griswold LLP

(57) ABSTRACT

Systems, methods, and computer-readable media are presented for generating notifications for a person according to user-defined notification templates. In contrast to presenting notifications according to a default notification template, the disclosed subject matter is directed to generating a notification regarding a notification signal according to a user-defined notification template. Upon receiving a notification signal, a determination is made as to whether a first user-defined notification template from a template store is applicable to the notification signal. Upon determining that the user-defined notification template is applicable to the received notification signal, a notification corresponding to the notification signal is generated and presented according to the user-defined notification template.

19 Claims, 9 Drawing Sheets

(51) Int. Cl.
*H04L 41/0686* (2022.01)
*G06Q 10/10* (2012.01)

(56) References Cited

U.S. PATENT DOCUMENTS

| | | | |
|---|---|---|---|
| 7,877,694 B2* | 1/2011 | Antonelli | H04L 29/06 |
| | | | 715/714 |
| 7,909,238 B2 | 3/2011 | Flake et al. | |
| 8,396,897 B2 | 3/2013 | Rohall | |
| 8,612,528 B2* | 12/2013 | Rinard | H04W 4/021 |
| | | | 709/206 |
| 8,682,819 B2 | 3/2014 | Consul et al. | |
| 9,020,921 B2* | 4/2015 | Alber | G11B 27/002 |
| | | | 707/705 |
| 9,203,814 B2* | 12/2015 | Perez | H04L 63/0428 |
| 2002/0174149 A1 | 11/2002 | Conroy et al. | |
| 2003/0079185 A1 | 4/2003 | Katariya et al. | |
| 2005/0262214 A1 | 11/2005 | Bagga et al. | |
| 2006/0265666 A1 | 11/2006 | Bornstein et al. | |
| 2008/0021969 A1 | 1/2008 | Oliver et al. | |
| 2008/0281922 A1 | 11/2008 | Renshaw et al. | |
| 2009/0106650 A1* | 4/2009 | Haynes | G06F 17/2264 |
| | | | 709/206 |
| 2009/0152341 A1 | 6/2009 | Kasperkiewicz et al. | |
| 2012/0136939 A1 | 5/2012 | Stern et al. | |
| 2014/0067497 A1* | 3/2014 | Butler | G06Q 30/02 |
| | | | 705/14.5 |
| 2016/0294964 A1* | 10/2016 | Brune | G06N 99/005 |

OTHER PUBLICATIONS

"Creating Customized Message Templates", Retrieved from <<http://www.Isoft.com/manuals/maestro/4.0/htmlhelp/interface%20customization/MessageTemplates.html>>, Oct. 1, 2013, 13 Pages.

"Template Processor", Retrieved from <<https://en.wikipedia.org/w/index.php?title=Template_processor&oldid=674730288>>, Aug. 5, 2015, 5 Pages.

"Web Template System", Retrieved from <<https://en.wikipedia.org/w/index.php?title=Web_template_system&oldid=678890482>>, Sep. 1, 2015, 12 Pages.

Kozlowski, et al., "Mastering Web Application Development with AngularJS", In the Book Mastering Web Application Development with AngularJS Published by Packt Publishing Ltd, Aug. 23, 2013, 372 Pages. (pp. 1-185).

Kozlowski, et al., "Mastering Web Application Development with AngularJS", In the Book Mastering Web Application Development with AngularJS Published by Packt Publishing Ltd, Aug. 23, 2013, 372 Pages. (pp. 186-372).

"International Search Report and Written Opinion Issued in PCT Application No. PCT/US2016/052363", dated Nov. 17, 2016, 13 Pages.

William, Francis J., "Android Jelly Bean makes notifications even fancier", Retrieved from <<http://www.techrepublic.com/blog/software-engineer/android-jelly-bean-makes-notifications-even-fancier/>>, Jul. 25, 2012, 7 Pages.

Windley, Phillip J., "The Live Web: Building Event-Based Connections in the Cloud", In the Book The Live Web: Building Event-based Connections in the Cloud, Published by Course Technology PTR, A Part of Cengage Learning, Dec. 22, 2011, 138 Pages.

Carenini, et al., "Summarizing Email Conversations with Clue Words", In Proceedings of the Sixteenth International World Wide Web Conference, May 8, 2007, 10 pages.

"Add or Remove Now Cards", Published on: Jan. 23, 2015, Available at: https://support.google.com/websearch/answer/2819541?hl=en.

Cardinal, David, "Microsoft's Cortana Hands on: The Best of Google Now and Siri Combined", Published on: Apr. 4, 2014, Available at: http://www.extremetech.com/extreme/179777-microsofts-cortana-hands-on-the-best-of-google-now-and-siri-combined.

* cited by examiner

USER-DEFINED NOTIFICATION TEMPLATES

BACKGROUND

As people become more and more reliant upon computer and computing devices, the number of notifications or alerts any one person receives from a device seems to be constantly increasing. Indeed, people receive reminders regarding a wide variety of messages: new text messages and/or emails; updates to programs; presence/availability of a Wi-Fi (wireless) network connection; birthday and/or anniversary reminders; appointments; traffic warnings; and the like. Of course, all of these notifications are based on the occurrence of some underlying condition, conditions which are tracked by one or more computing devices. Further, these notification are presented to use through our mobile phone devices, on our computers, on our tablets, on devices in our cars, and the like.

Generally speaking, each notification is a canned notification, i.e., a predetermined notification of a format and including data as defined by the program (or app or application) from which the notification originates, or by the operating system that detects the conditions and provides the notifications to the user. While the notifications provide some level of information regarding the underlying event/condition (at the minimum that a qualifying event occurred), most would agree that the notifications could be much more useful to a person if the right information and responses were present in the notifications. Unfortunately, what is useful information to one person, or the correct response to a notification, might not be particularly useful to another. Since a program cannot possibly understand (in advance) what may or may not be of significance to any one person for any given event/occurrence, the program simply provides a "canned" notification.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Systems, methods, and computer-readable media are presented for generating notifications for a person according to user-defined notification templates. In contrast to presenting notifications according to a default notification template, the disclosed subject matter is directed to generating a notification regarding a notification signal according to a user-defined notification template. Upon receiving a notification signal, a determination is made as to whether a first user-defined notification template from a template store is applicable to the notification signal. Upon determining that the user-defined notification template is applicable to the received notification signal, a notification corresponding to the notification signal is generated and presented according to the user-defined notification template.

According to aspects of the disclosed subject matter, a method for presenting a notification from a notification source on a computing device is presented. A template store is provided to the system. The template store includes one or more user-defined notification templates corresponding to notification signals. Upon receiving a notification signal from a notification source, a determination is made as to whether a first user-defined notification template in the template store is applicable to the received notification signal. Upon determining that the first user-defined notification template is applicable to the notification signal, a notification is generated, the notification corresponding to the received notification signal generated according to the first user-defined notification template. The generated notification is presented on the computing device as a notification regarding the received notification signal.

According to additional aspects of the disclosed subject matter, a computer-readable medium bearing computer-executable instructions for carrying out a method for generating a notification in response to a notification signal is presented. A template store is provided to the system. The template store includes one or more user-defined notification templates corresponding to notification signals. Subsequently, upon receiving a notification signal from a notification source, a determination is made as to whether a first user-defined notification template in the template store is applicable to the received notification signal. Upon determining that the first user-defined notification template is applicable to the notification signal, a notification is generated, the notification corresponding to the received notification signal generated according to the first user-defined notification template. The generated notification is presented on the computing device as a notification regarding the received notification signal.

According to further aspects of the disclosed subject matter, a computing device for presenting a notification in response to receiving a notification signal is presented. The computing device includes a processor and a memory, where the processor executes instructions stored in the memory as part of or in conjunction with additional components to present a notification in response to receiving a notification signal. The additional components include one or more notification sources, a notification system, a notification building, and a template store. Regarding the notification sources, each notification source is configured to detect a triggering condition corresponding to an event or condition for which a notification is to be generated. Upon detecting a triggering condition, the notification sources generate and issue a notification signal. The notification system is configured to receive an issued notification signal, and upon receiving the notification signal, determine whether or not a first user-defined notification template in a template store is applicable to the notification signal. Upon determining that the first user-defined notification template is applicable to the notification signal, the notification system provides the first user-defined notification template and the notification signal to a notification builder. The notification builder is configured to obtain the user-defined notification template and the notification signal from the notification system and generate a notification corresponding to the received notification signal according to the first user-defined notification template. The generated notification is then presented on the computing device via an input/output (I/O) system of the computing device

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

For purposes of clarity, the term "exemplary," as used in this document, should be interpreted as serving as an illustration, a sample or an example of something, and it should not be interpreted as an ideal and/or a leading illustration or sample of that thing.

The term "notification signal" corresponds to a signal sent to a notification system of a computing device from a notification source. The notification signal typically includes an indication as to the nature of the triggering event or condition for which the notification signal is sent, as well as other information provided by the notification source. This other information may include, by way of illustration and not limitation, additional content or subject matter relating to the triggering event/condition, a date and/or time in which the event/condition was detected by the notifying source, and the like. Correspondingly, the term "notifying source" corresponds to an executable module that signals the notification system of a computing device to potentially issue a notification upon detection of a triggering condition or event. A notifying source may be an app or application, a service, a daemon, or other executable module on the computing device. In contrast to a notification signal, the term "notification" corresponds to an organization of content regarding the triggering event or condition that is generated according to a notification template and presented to the person via the computing device.

The term "notification template" corresponds to pattern for organizing content corresponding to a notification received from a notification source. The content of the notification template may correspond/include content or subject matter relating to the underlying condition/event that triggered the notification to be sent by a notifying source. For example and by way of a non-limiting illustration, a notification template to organized content of a received email may include content from the email itself, include the subject line of the email, and/or the sender of the email, and the message of the email. The term "user-defined notification template" corresponds to a default notification template that was created independently of the notifying source and the notification system, typically by a user. A user-defined notification template is not a default template—i.e., it is selected (and potentially defined by) the person operating the computing device for use in conjunction with a received notification. Moreover, a user-defined notification template is conditioned upon one or more criteria as defined and associated with the user-defined notification template.

Figure 1:
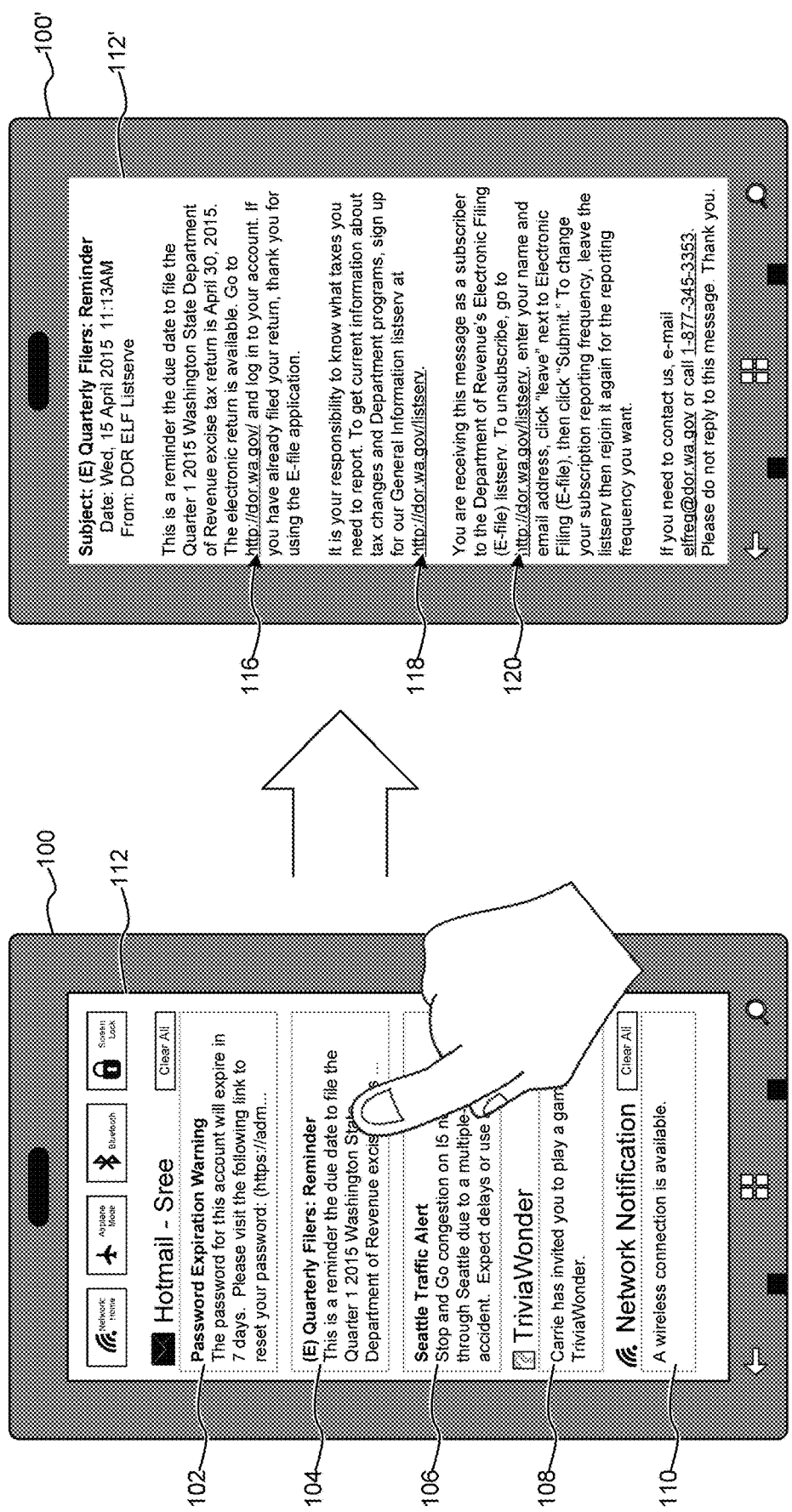
FIG. 1 is a pictorial diagram illustrating various notifications, generated according to default notification templates defined by a notification source or by the notification system of an exemplar computing device.

As indicted above, while a person (an owner of a computing device) may receive notifications on his/her computing device from a variety of notification sources based on any number of triggering events or conditions, currently the notifications are generated according to default notification templates defined by the notifying source or by the notification system that issues the notifications to the person on the computing device in response to a notification signal. Indeed, in regard to the default notification templates, FIG. 1 is a pictorial diagram illustrating various notifications, generated according to default notification templates defined by a notification source or by the notification system of an exemplar computing device. Indeed, FIG. 1 illustrates a computing device 100 showing several notifications, including notifications 102-110, for display to a person in a display area 112 of the computing device. As can be seen, the illustrated notifications include notifications 102-106 corresponding to notification signals of received emails, notification 108 corresponding to a notification signal from a game in which the person is participating, and notification 110 corresponding to a notification signal regarding an available wireless connection.

As will be readily appreciated, with notifications organized according to default notification templates, in order to fully view or interact with the underlying content of a notification, the person must select or otherwise activate the notification. Typically, the selection and/or interaction causes the basis underlying the notification to be presented. For example, if the person to whom the notifications 102-110 are presented were to select/activate notification 104 in order to view the email message, this selection or interaction causes the email message to be displayed in the in display area 112' of computing device 100'. Illustratively, email message 114 includes several hyperlinks, such as hyperlinks 116-120, by which the person can carry out a desired task. In the present example, the various hyperlinks 116-120 allow the person to navigate to a web site (e.g., hyperlink 116 to "http://dor.wa.gov") in order to carry out one or more tasks associated with taking care of the person's quarterly tax filings.

Of course, as an alternative to immediately carrying out the task associated with taking care of the person's quarterly tax filings by selecting one or more of the embedded hyperlinks, the person may instead wish generate a calendar event for a future date in which the person will then take care of his/her quarterly tax filings. Unfortunately, there are number of steps from receiving the notification 104 to navigating to the hyperlinked site to satisfy the tax obligation, or from the notification 104 to adding an item to the person's calendar to take care of the obligation on a future date. Indeed, both illustrative alternatives involve one or more intermediate steps to accomplish a desired result. In other words, the person must take several positive, but intermediate, actions in order to carry out a desired result with regard to the notification 104. While this may be a satisfactory process for responding to notifications based on atypical and/or infrequent conditions, quite often a person will encounter notifications that are triggered by underlying conditions or events that are repeated, anticipated, and/or that can be identified in advance. Moreover, when these anticipated or repeated underlying conditions or events trigger a notification to be issued, significant and substantial efficiencies can be realized, both in terms of efficiencies in computing processing and a corresponding efficiency in power savings, as well as efficiencies in regard to user interaction. Indeed, according to aspects of the disclosed subject matter, these efficiencies can be realized through the use of user-defined notification templates, which include the ability for the notified person to directly achieve and/or access a desired result without the intermediate processing steps.

According to aspects of the disclosed subject matter, instead of relying upon the default templates, which are created as generic templates to handle all notifications of the notifying sources, the person/user of a computing device can alternative create or select a user-defined notification template for use in regard to a particular notification source such that notifications from a notification source may be formatted or organized in a manner that is of greater value the person. Further, according to additional aspects of the disclosed subject matter, the user-defined notification template may be selected according to conditions associated with the template based on factors within or associated with the notification signal.

Figure 2:
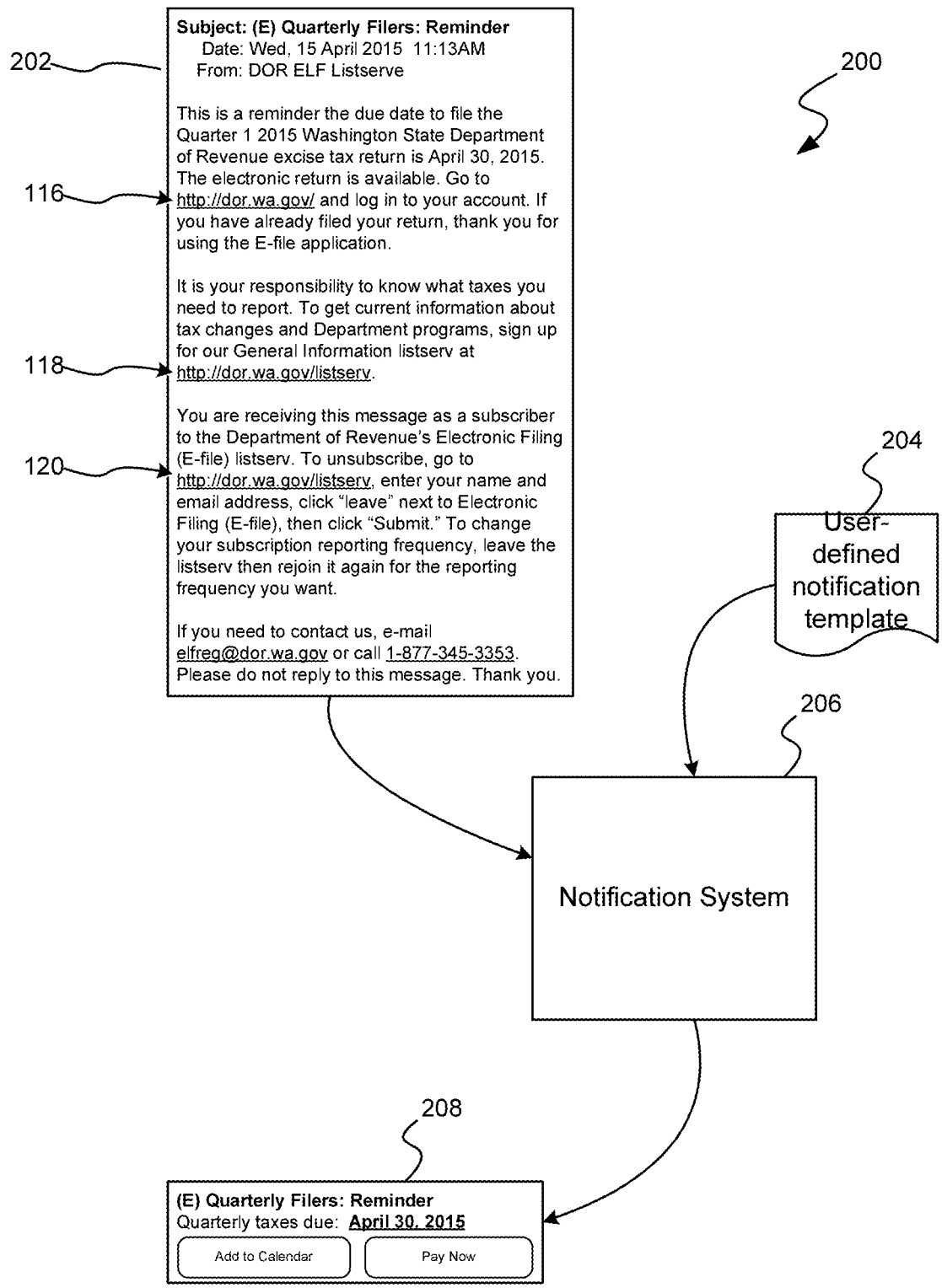
FIG. 2 is a pictorial diagram illustrating exemplary processing of a notification signal into a notification that can be issued to the person/user of a computing device, according to aspects of the disclosed subject matter.

By way of illustration, FIG. 2 is a pictorial diagram illustrating exemplary processing 200 of a notification signal into a notification that can be issued to the person/user of a computing device, according to aspects of the disclosed subject matter. For illustration purposes, the email 202 corresponding to notification 104 is shown as the notification signal sent to the notification system 206. As indicated earlier, the email 202 includes several hyperlinks 116-120 that the person can navigate in carrying various activities of paying the required quarterly taxes (as described in the email). For purposes of this example, it is assumed that the person/user has selected or created a user-defined template 204 for use when the notification system 206 receives an email, such as email 202, regarding quarterly tax filings is received. Indeed, the user-defined template 204 may have various dependent conditions for its use. In the present example and for illustration purposes, it is assumed that the user defined template 204 has a condition of at least: (1) an email signal, (2) that the email is received from a specific sender ("DOR ELF Listserve"), (3) the subject line of the email is "(E) Quarterly Filers: Reminder," and (4) includes a hyperlink (hyperlink 116) to navigate to the payment site. In addition to conditions, it is assumed that the creator of the user defined template 204 has determined that the presentation of the content of the applicable notification signal (i.e., the email 202) should be presented in a manner such that certain information regarding the content is displayed and the viewer (i.e., the person/user of the computing device) is also presented with actions that can be taken with regard to the notification. In regard to an applicable notification signal, a notification template is applicable to a notification signal if the conditions associated with the notification template are applicable to and satisfied by the underlying basis (the basis of the notification signal, metadata and content associated with the notification signal, and the like).

The notification system 206, upon receiving the notification signal from a notification source (not shown), determines that a user defined notification template, user defined notification template 204, has been subscribed to emails, i.e., when a notification signal of a particular type is received and the conditions associated with the template are satisfied, then the third-party notification template is to be used in place of a default template. The notification system 206 obtains the user-defined notification template 204 and evaluates the various conditions associated with the template to determine whether or not it is applicable to the notification signal (i.e., the email 202). Upon evaluating the conditions associated with the notification signal/email and determining that it is applicable, a notification 208 is generated according to the user-defined notification template and issued to the person via the computing device.

Figure 3:
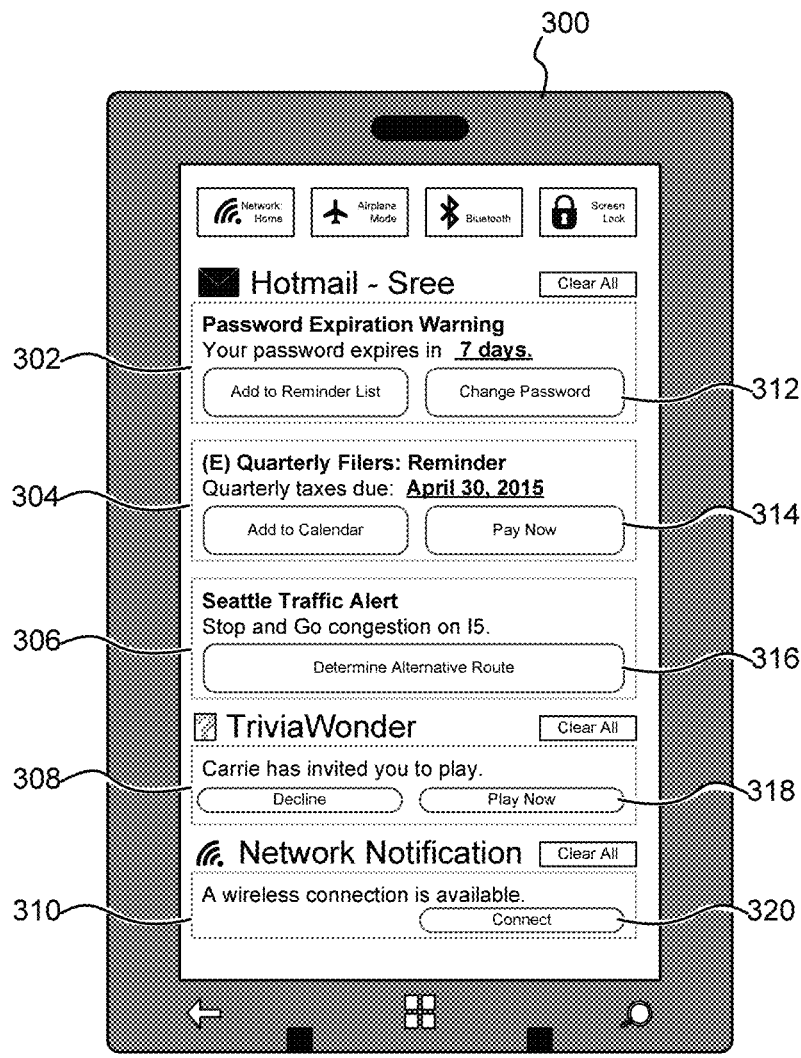
FIG. 3 is a pictorial diagram illustrating various notifications, generated according to user-defined notification templates, in accordance with aspects of the disclosed subject matter.

By way of illustrating the results of notifications, such as notification 208, generated according to user-defined notification templates, FIG. 3 is a pictorial diagram illustrating various notifications 302-310, generated according to user-defined notification templates, in accordance with aspects of the disclosed subject matter. These notifications 302-310 are illustratively generated from the same underlying notification signal as notifications 102-110 of FIG. 1. As can be seen, the notifications 302-310 present information of the underlying notification signals that were used to generate the notifications 102-110 of FIG. 1, but notifications 302-310 were generated according to user-defined notification templates instead of default templates. Moreover, each of notifications 302-310, as illustrated on the computing device 300, also include user-actionable controls for conducting one or more actions as defined in the corresponding user-defined notification template.

Figure 4:
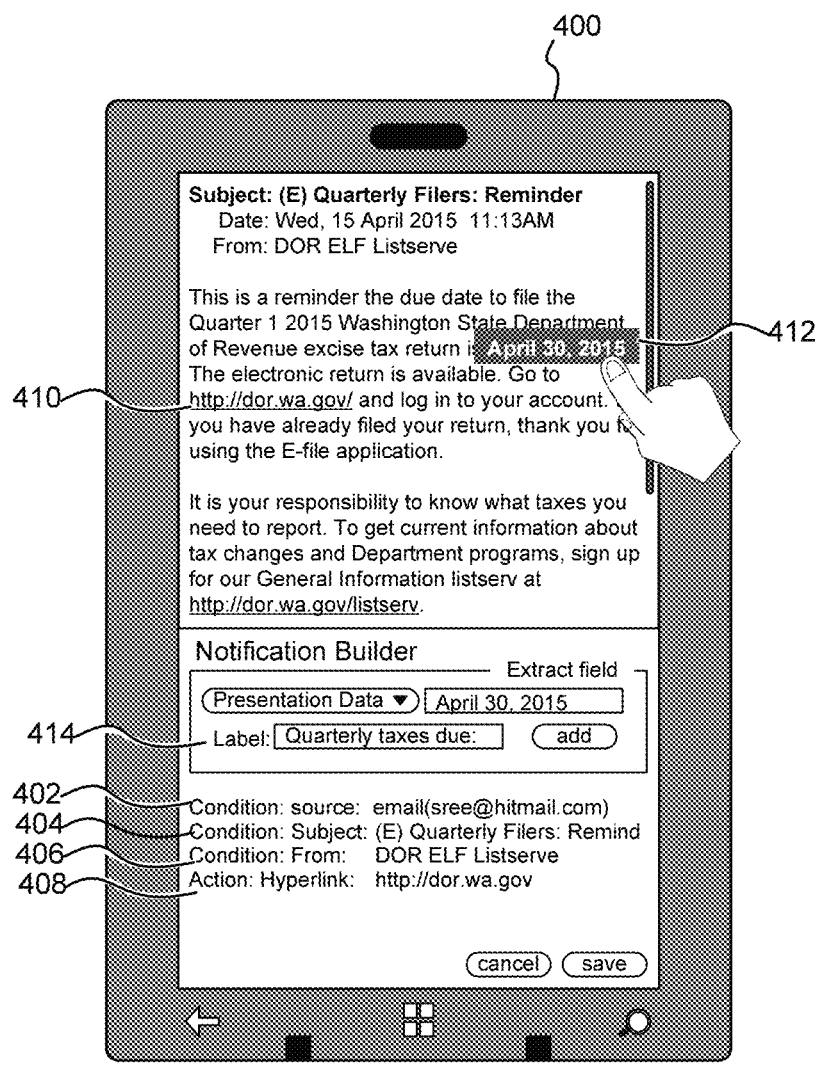
FIG. 4 is a pictorial diagram illustrating an exemplary interface of a notification builder as presented on a computing device.

As indicated above, in constructing or building a user-defined notification template, the person/creator is able to define the conditions for which the template is applicable to a notification signal, display and presentation information in regard to the format and/or arrangement of a generate notification (including user-added labels, images, data, and the like), as well as actions to be presented to the person viewing the notification. For example, FIG. 4 is a pictorial diagram illustrating an exemplary interface 402 of a notification builder as presented on a computing device 400. As illustrated, a person/user may use the basis of a notification signal (in this case the email for which notification 104 of FIG. 1 was generated) and identify various features, conditions, and the like for determining the applicability of the notification template to a notification signal and in formatting and presenting the notification to a user on a computing device. In the present illustration, the current user-defined notification template is currently configured with several conditions including condition 402 corresponding to the basis of the notification signal, particularly in regard to receiving an email at the account, "sree@hitmail.com"; condition 404 corresponding to the subject of the email, particularly when the subject is "(E) Quarterly Filer: Reminder"; and condition 406 corresponding to the sender of the email, particularly when the sender is "DOR ELF Listserve". Additionally, the current user-defined notification template is currently configured with an action 408, the action corresponding to navigating the hyperlink 410 as set forth in the email body. Still further illustrated, the user/person is also in the process of adding informative presentation data, i.e., the text 412 of the email body, in conjunction with a user-supplied label 414, "Quarterly taxes due:".

Regarding the actions that can be included in a user-defined notification template and according to aspects of the disclosed subject matter, a notification builder will include a list of actions that are available for use in a notification. This list of actions will typically be stored in an action data store accessible to (or maintained by) the notification builder. The actions correspond to various actions that can be implemented by one or more apps, applications, executable modules, or services, and the like, that are available to the user via activation of user-actionable controls (such as user actionable controls 312-320 of FIG. 3) within a notification. Correspondingly, the apps, applications, executable modules, services, and the like, publish the actions/activities that each can perform, along with the requisite and optional parameters for conducting the activities, such that the notification builder can generate a template to include one or more activities. Similarly, the notification system that presents the notifications to the user may have access to the list of actions in the action data store such that the notification system can effectuate any action upon user selection of a corresponding control. With reference to FIG. 3, user actionable control 318 may be configured to cause the corresponding exemplary game, TriviaWonder, to be executed (if not already executing) and to cause the game to participate in the game with "Carrie," in response to the request of the displayed notification 308.

Figure 5:
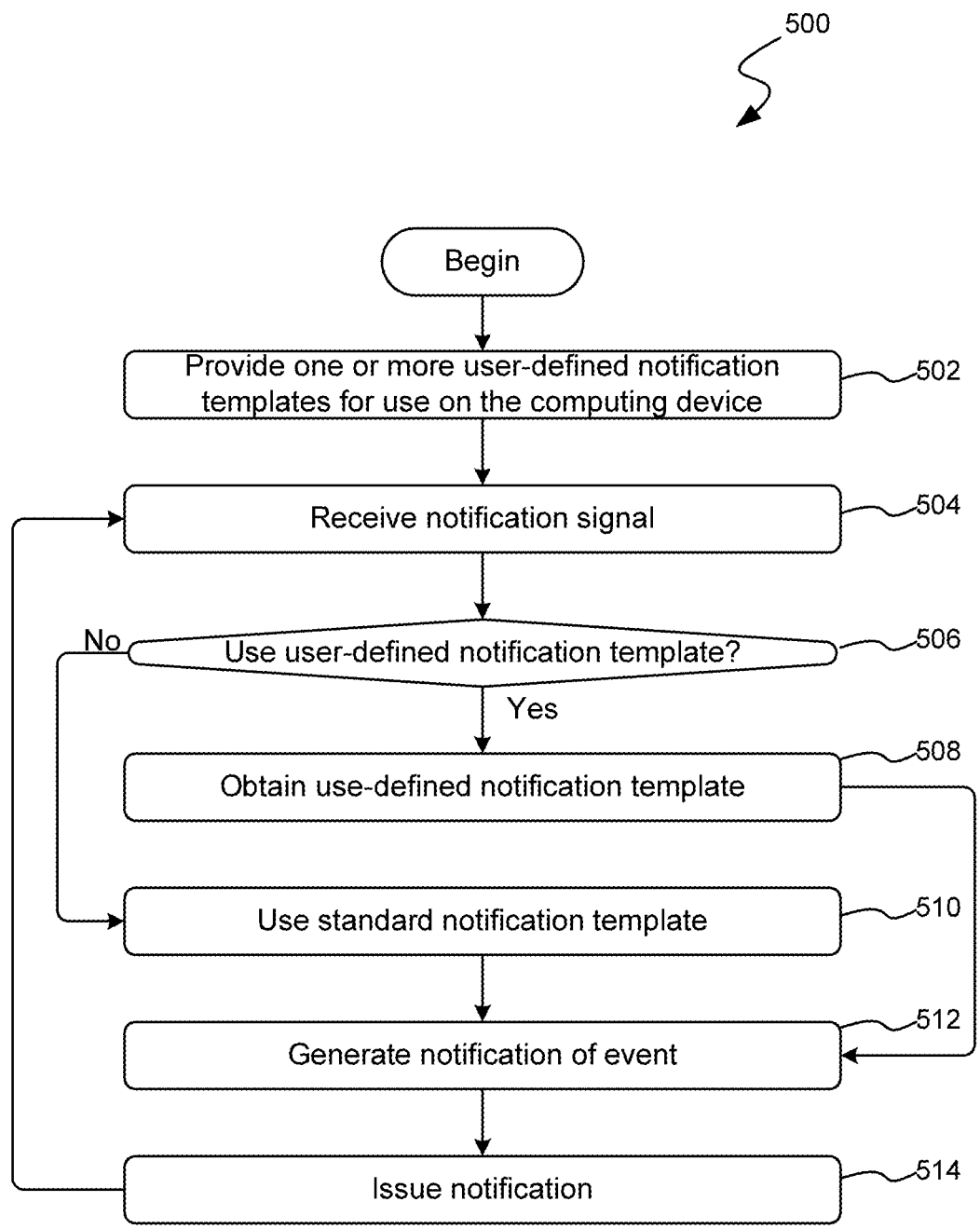
FIG. 5 is a flow diagram for presenting a notification to the person/user of a computing device, in accordance with aspects of the disclosed subject matter.

Turning now to FIG. 5, FIG. 5 is a flow diagram for presenting a notification to the person/user of a computing device, in accordance with aspects of the disclosed subject matter. Beginning at block 502, one or more user-defined notification templates are provided. Typically, these user-defined notification templates are stored in a template data store available to the notification system, which receives and processes the notification signals from the various notification sources as discussed above.

At block 504, the exemplary routine 500 receives a notification signal from a notification source. At decision block 506, a determination is made as to whether to use a user-defined notification template for presenting the subject matter of the notification signal, or to use a default template. This determination is typically made according to the basis of the notification signal (i.e., is it an email, a text-message, a game notification, etc.) as well as information regarding the user-defined notifications in the notification data store. Of course, as indicated above, this information will include the conditions for determining whether any given user-defined notification template is applicable to the received notification signal.

Of course, it should be appreciated that determining whether the basis of a notification signal is applicable to a user-defined notification template is a conditional evaluation and, therefore, the basis of a notification signal (i.e., an indication of the event or condition that triggered the notification signal) may be viewed as a condition associated with a user-defined notification template, when referring to conditions of a user-defined notification template the basis of the notification signal is not considered part of the "conditions." Conditions of a user-defined notification template typically correspond to aspects of the content and/or metadata that is provided in regard to the notification signal, but not the particular basis of the notification signal.

Upon determining that the conditions corresponding to a user-defined notification template are satisfied such that the user-defined notification template is to be used, the routine proceeds to block 508 where the user-defined notification template is obtained. Of course, in the alternative, if the conditions corresponding to user-defined notification templates are not satisfied, then a standard, default notification template is used. In either event, after having obtained a notification template to use, at block 512 a notification is generated (based on the obtained notification template.) At block 514, the generated notification is issued (i.e., display or presented) to the person on the computing device. Thereafter, the routine returns to block 504 to await additional notification signals. Indeed, this is an ongoing process/routine to continually process received notification signals.

Regarding routine 500, and 800 described below, as well as other processes describe in this document, while these routines/processes are expressed in regard to discrete steps, these steps should be viewed as being logical in nature and may or may not correspond to any actual and/or discrete steps of a particular implementation. Also, the order in which these steps are presented in the various routines and processes should not be construed as the only order in which the steps may be carried out. In some instances, some of these steps may be omitted. However, those skilled in the art will recognize that the logical presentation of these steps is sufficiently instructive to carry out aspects of the claimed subject matter, irrespective of any particular language in which the logical instructions/steps are embodied.

Of course, while the described routine includes various novel features of the disclosed subject matter, other steps (not listed) may also be carried out in the execution of the subject matter set forth in these routines. Those skilled in the art will appreciate that the logical steps of this and other routines may be combined together or be comprised of multiple steps. Steps of the above-described routine may be carried out in parallel or in series. Often, but not exclusively, the functionality of various routines is embodied in software (e.g., applications, system services, libraries, and the like) that is executed on one or more processors of computing devices, such as the computing device described in regard FIG. 6 below. Additionally, in various embodiments, routine 500 may also be embodied in executable hardware modules including, but not limited to, system on chips, specially designed processors and or logic circuits, and the like on a computer system.

Routines and/or processes are typically embodied within executable code modules comprising subroutines, functions, looping structures, selectors such as if-then and if-then-else statements, assignments, arithmetic computations, and the like. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While novel aspects of the disclosed subject matter are expressed in routines embodied within applications (also referred to as computer programs), apps (small, generally single or narrow purposed, applications), and/or methods, these aspects may also be embodied as computer executable instructions stored by computer readable media, also referred to as computer readable storage media, which are articles of manufacture. As those skilled in the art will recognize, computer readable media can host, store and/or reproduce computer executable instructions and data for later retrieval, execution, reading, manipulation, and/or storage. When the computer executable instructions that are hosted or stored on the computer readable storage devices are executed, the execution thereof causes, configures and/or adapts the executing computing device to carry out various steps, methods and/or functionality, including those steps, methods, and routines described above in regard to the various illustrated routines. Examples of computer readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. While computer readable media may deliver the computer executable instructions (and data) to a computing device for execution via various transmission means and mediums including carrier waves and/or propagated signals, for purposes of this disclosure computer readable media expressly excludes carrier waves and/or propagated signals (i.e., the transmission means of the executable instructions per se.)

Figure 6:
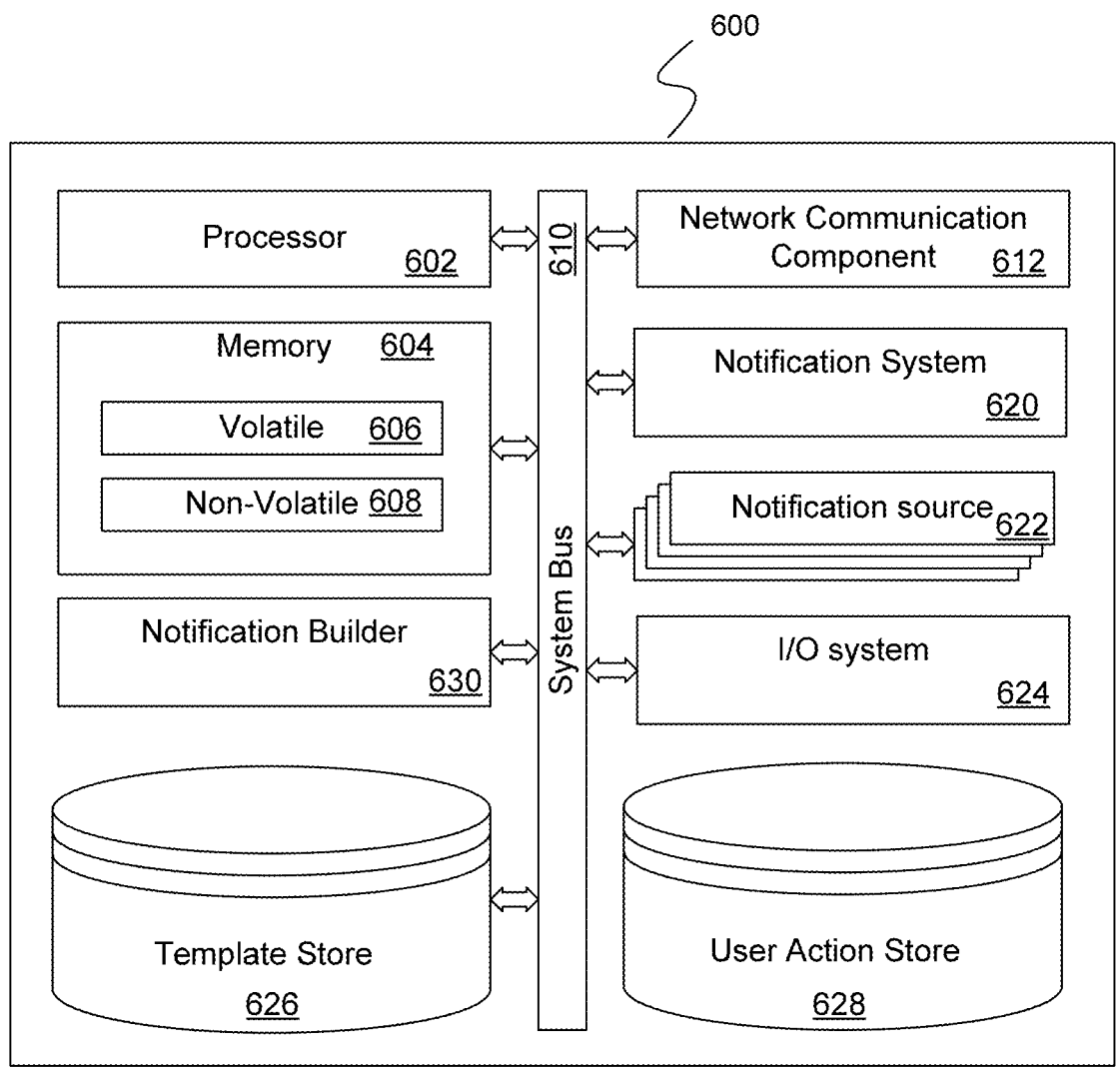
FIG. 6 is a block diagram illustrating exemplary components of computing device configured according to aspects of the disclosed subject matter.

Turning now to FIG. 6, FIG. 6 is a block diagram illustrating exemplary components of computing device 600 configured according to aspects of the disclosed subject matter. The exemplary computing device 600 includes one or more processors (or processing units), such as processor 602, and a memory 604. The processor 602 and memory 604, as well as other components, are interconnected by way of a system bus 610. The memory 604 typically (but not always) comprises both volatile memory 606 and non-volatile memory 608. Volatile memory 606 retains or stores information so long as the memory is supplied with power. In contrast, non-volatile memory 608 is capable of storing (or persisting) information even when a power supply is not available. Generally speaking, RAM and CPU cache memory are examples of volatile memory 606 whereas ROM, solid-state memory devices, memory storage devices, and/or memory cards are examples of non-volatile memory 608.

Further still, the illustrated computing device 600 includes a network communication component 612 for interconnecting this computing device with other devices over a computer network, including user computing devices and entity websites. The network communication component 612, sometimes referred to as a network interface card or NIC, communicates over a network using one or more communication protocols via a physical (e.g., wired, optical, etc.) connection, a wireless connection, or both. As will be readily appreciated by those skilled in the art, a network communication component, such as network communication component 612, is typically comprised of hardware and/or firmware components (and may also include or comprise software components) that transmit and receive digital and/or analog signals over a transmission medium (i.e., the network.)

The processor 602 executes instructions retrieved from the memory 604 (and/or from computer-readable media) in carrying out various functions, particularly in regard to responding to a location-activity search query, as discussed and described above. The processor 602 may be comprised of any of a number of available processors such as single-processor, multi-processor, single-core units, and multi-core units. A typical computing device includes devices such as handheld computers and/or personal digital assistants (PDAs), smart phones, tablet computers, the so-called phablet computers (a hybrid of a smart phone and tablet computer), laptop computers, desktop computers, wearable computing devices such as watches and the like, etc.

The exemplary computing device 600 further includes an i/o system 624 including an output subsystem through which content may be presented, displayed, and/or played to a user through one or more output channels (e.g., display, audio, haptic feedback, etc.) as well as an input subsystem through which a person/user can interact with the computing device to provide user input (e.g., a touch sensitive surface, a keyboard, a mouse, a microphone, physical controls, and the like.)

The exemplary computing device 600 also includes a notification system 620. As indicated above, the notification system receives notification signals from one or more notification sources 622 and is configured to determine whether a received notification signal satisfies a user-defined notification template. Moreover, the notification system 620 is further configured to generate a notification according to a user-defined notification template upon determining that the basis of a notification signal satisfies any conditions associated with the user-defined notification template. Alternatively, the notification system 620 is configured to generate a notification according to a default notification template associated with the basis of the notification signal. The user-defined notification templates are stored in a template store 626 of the computing device 600. User actions, those actions that can be present in a notification generated from a user-defined notification template, are stored in a user action store 628 and accessed by the notification system 620.

Still further, the exemplary computing device 600 includes a notification builder 630. As indicated above in regard to FIG. 4, the notification builder 630 provides the user interface (via the I/O system 624) to interact with the person/user in regard to building a user-defined notification template.

In addition to the notification builder 630 providing an interface through which the person/user can build a user-defined notification template, the notification builder may also be configured to provide the ability to the person to share a user-defined notification template with other users. Sharing user-defined notification templates may be conducted over a network in conjunction with an online service (not shown) that can receive and/or share user-defined notification templates with various persons. Accordingly, in addition to defining one's own user-defined notification templates, a person may also obtain, from a collection of user-defined notification templates, one or more user-defined notification templates. Moreover, by way of the notification builder 630, the person/user of a computing device may customize and/or modify an obtained user-defined notification template, as well as share the customized or modified template through the online service.

While much of the description above is made in regard to providing notifications (generated according to user-defined notification templates), it should be appreciate that the disclosed subject matter may be applied in various other situations and circumstances. For example, in addition to providing user-defined notifications on a computing device, user-defined notification templates may be used in situations where presentation of underlying data is needed. For example, a user-defined notification template (or more generically, a user-defined template) may be used in an email system as a preview for received emails that satisfy the conditions associated with the user-defined template. Even further, user-defined templates may be used as a primary display mechanism of an email system for those emails that satisfy the conditions of the template. As with generated notifications, the resulting presentation of an email (or a preview of an email) may include user-actionable controls based on the content of the email and actions available in an action store.

Additionally, while the disclosed subject matter is described in regard to utilizing user-defined notification templates, in a more general sense the disclosed subject matter is directed to utilizing non-default, user-defined presentation templates in regard to incoming signals that meet the conditions of a non-default, user-defined presentation template. For example (by way of illustration and not limitation), an email is typically presented to a user according to a default form. However, an email user may wish to create a user-defined presentation template regarding emails he/she receives from a local library regarding an over-due book. In a similar manner as presented above in regard to user-defined notification templates, the user may create a user-defined presentation template that identifies the conditions upon which the user-defined presentation template is applicable. Examples include, by way of illustration and not limitation, file lists, email, and the like.

Figure 7A:
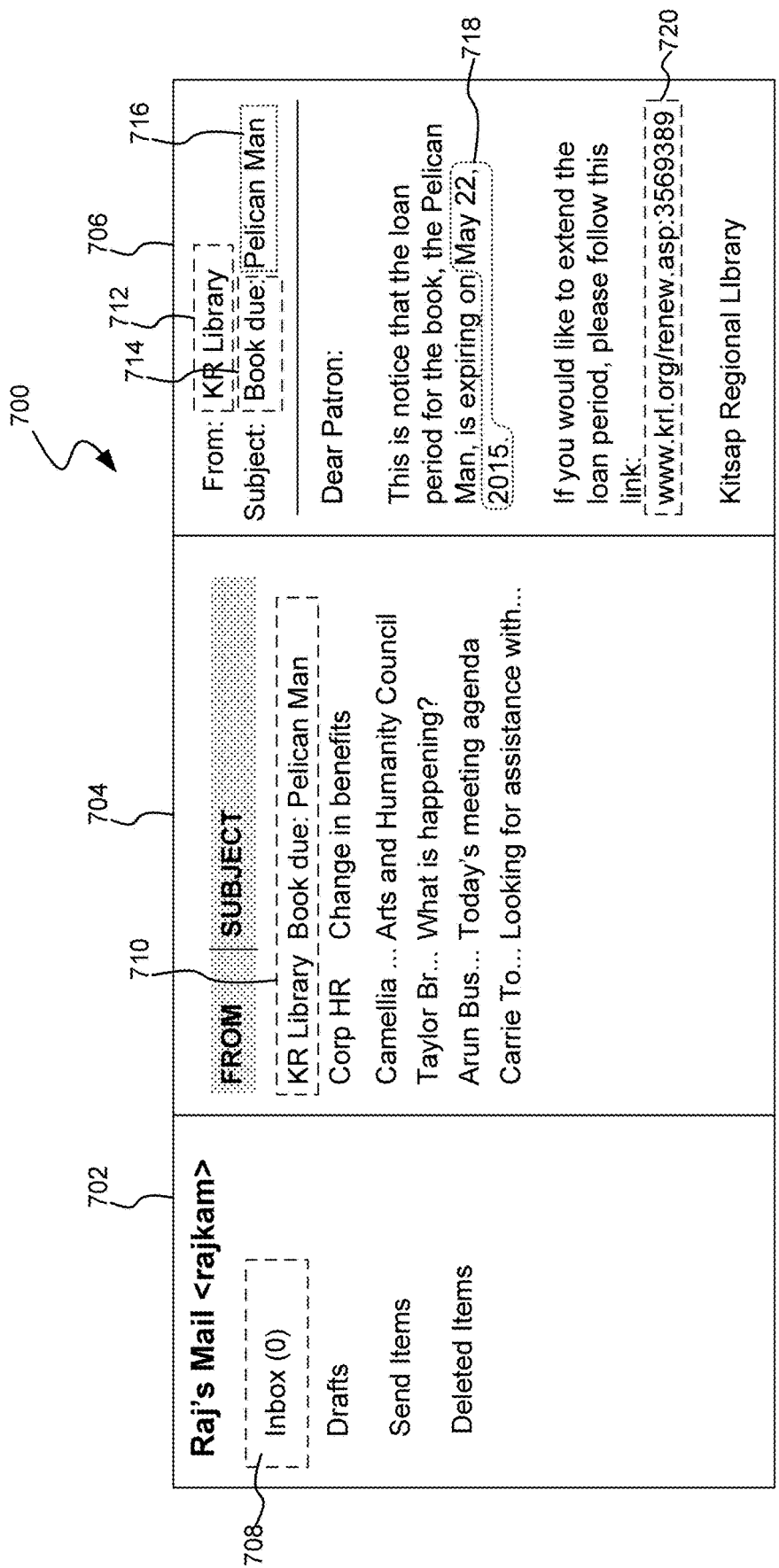
FIGS. 7A and 7B are pictorial diagrams illustrating an exemplary email interface presenting an email according to a default presentation template and a user-defined presentation template, respectively.
Figure 7B:
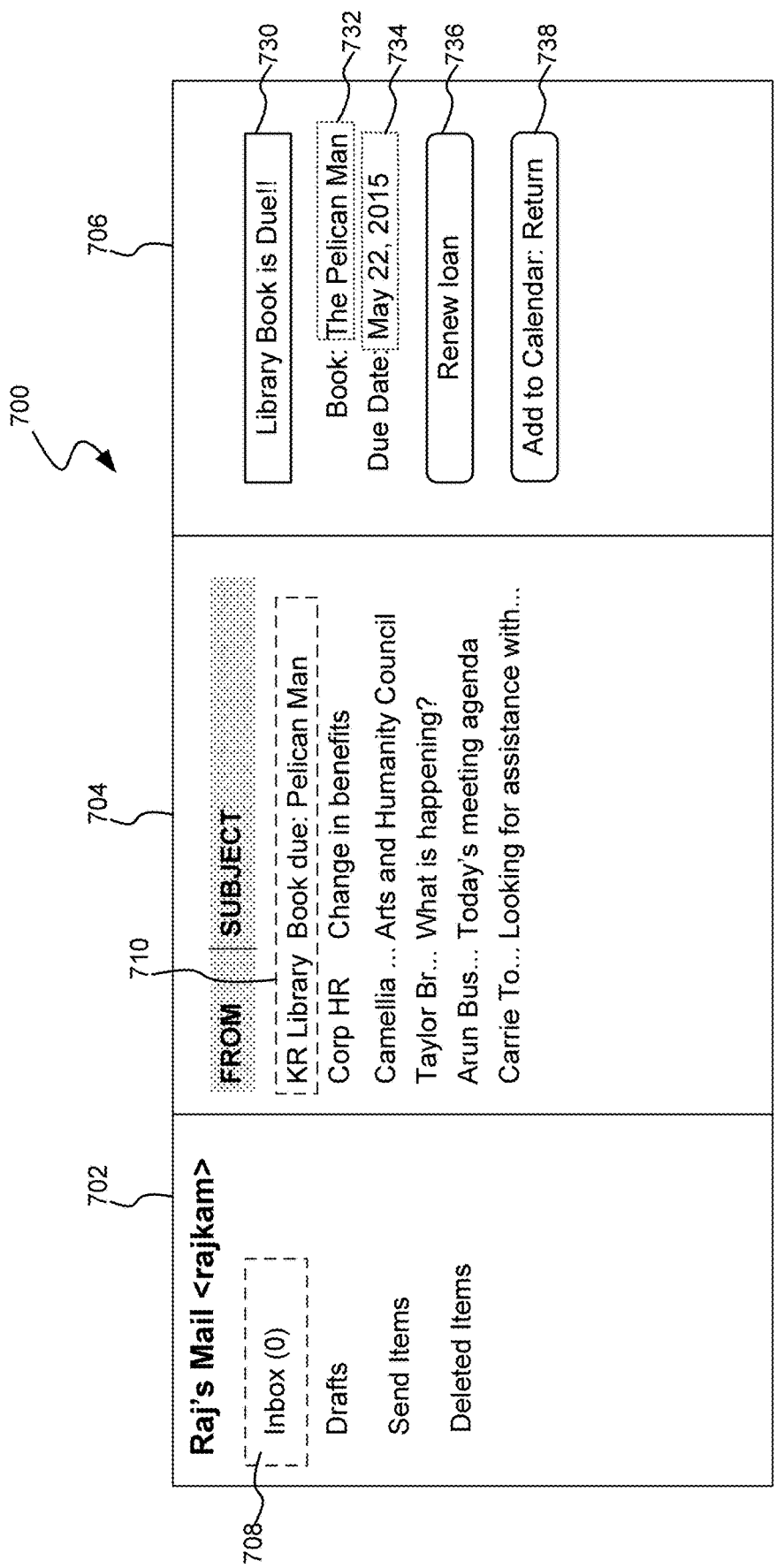

In regard to the presentation of email via a user-defined presentation template and by way of example, FIGS. 7A and 7B are pictorial diagrams illustrating an exemplary email interface presenting an email according to a default presentation template and a user-defined presentation template, respectively. As shown in FIG. 7A, an email interface 700 includes a folder view 702, an email item list 704, and an email presentation view 706. An email in the "Inbox" folder 708 includes multiple email items, including email 710 that illustrates an exemplary email from a library regarding a book whose loan period is soon to expire. The email presentation view 706 illustrates the body of the email as presented according to a default presentation view of the email interface 700. As can be seen the presentation view 706, the email is from the local library as indicated by box 712, the email includes template language indicating that the lending period of the book is expiring (i.e., the book is due to be returned) as indicated by box 714, the email indicates the due date that the book must be returned for the current loan period as indicated by box 718, and the email includes a link, as indicated by box 720, that the user can follow to renew or extend the lending period.

Through a user interface for creating user-defined presentation templates, the user can create a custom template. In regard to the example shown in FIG. 7A, via a user interface for defined user-defined presentation templates for email, the user can indicate to a presentation module (e.g., a notification builder 630) the various elements to identify within an email, the conditions upon which the user-defined presentation template is relevant to an email, the arrangement of the data in the user-defined presentation template, as well as add actions to be taken with regard to the email. Turning to FIG. 7B, this figure illustrates the same email as presented according to a user-defined presentation template. In place of the default presentation of FIG. 7A, the presentation of FIG. 7B includes a notification bar 730 to indicate a warning to the user regarding the up-coming due date for return or renewal of the loaned book. Information from the email (as shown in FIG. 7A) is arranged and placed in conspicuous locations including the book title 732, the due date 734, a user-actionable control 736 that follows the link (see box 720) in the email to renew the book, as well as a user-actionable control 738 that adds a notification of the due date to the user's calendar.

Figure 8:
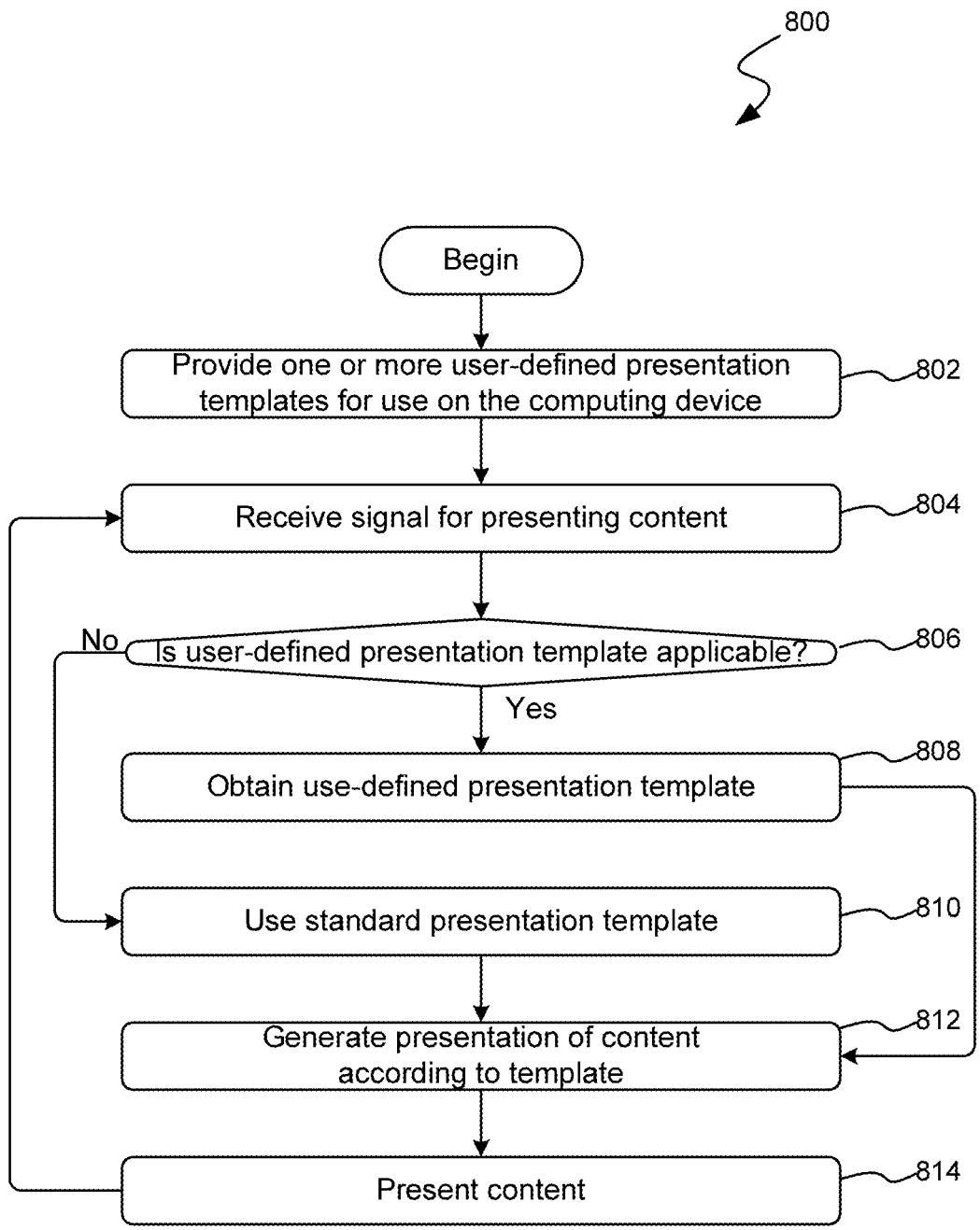
FIG. 8 is a flow diagram of an exemplary routine for generating a content presentation in accordance with aspects of the disclosed subject matter.

Turning now to FIG. 8, FIG. 8 is a flow diagram of an exemplary routine 800 for generating a content presentation in accordance with aspects of the disclosed subject matter. Indeed, while routine 500 of FIG. 5 is directed in particular to notifications on a computing device, routine 800 of FIG. 8 is directed to a more generic process of utilizing user-defined presentation templates to present content to a user. Beginning with block 802, one or more user-defined presentation templates are provided to the system for generating a presentation of content, such as an email viewer as described in the email view 706 of FIGS. 7A and 7B. At block 804, a signal is received to present content on an output device. At decision block 806, a determination is made as to whether any user-defined presentation template is applicable to the signal to present content. This determination may be made according to the conditions that are identified by the user with regard to the various user-defined presentation templates that are created. By way of illustration, these conditions may include (in the context of an email as illustrated in FIG. 7B) the sender of the email and the subject of the email. Of course, the conditions upon which a user-defined presentation template is based may widely vary and it is left to the user to define those conditions with regard to each user-defined presentation template.

If the conditions are met with regard to the user-defined presentation template, at block 808 the corresponding user-defined presentation template is selected for use in generating a presentation of the content. Alternatively, if the conditions are not met, at block 810 a default presentation template is selected. At block 812, a presentation of the content is generated according to the selected template. At block 814, the content is presented to the user. Thereafter, the routine 800 returns to block 804 to await additional signals to present content.

Clearly, notifications and emails are simply two examples of scenarios in which user-defined templates (such as user-defined notification templates or user-defined email presentation templates) may be used. Indeed, user-defined presentation templates may be applicable in any number of scenarios for presenting content to the user. In yet another example, digital assistants, such as Microsoft's Cortana as well as others, often present information drawn from a user's email, profile, and/or web information and present this information to the user according to various predetermined, default templates. However, just as a computer user may establish user-defined notification templates or email presentation templates, a user may interact with his/her digital assistant to define templates in which the digital assistant will interact with the user. As indicated above, these user-defined templates will establish the criteria or conditions upon which the user-defined template is applicable, the sources of data to be included in the user-defined template, any actions that the computer wishes to be performed, and the like.

As mentioned above, in addition to utilizing one's own user-defined templates, a computer user may interact with an online service that can receive and/or host the user-defined templates of various parties. This is advantageous as the user-defined templates are subject to a type of crowd-sourcing such that the best templates are developed (and continually refined) and shared. In a similar, but alternative manner, an enterprises, company, and/or other organization may maintain and deploy a library of notification templates that can be used by the members of the organization. Indeed, an information technology (IT) administrator for any given organization may establish a library of notification templates that can be used within the organization which lends itself to maintaining security (e.g., limiting functionality to use pre-approved actions and programs, resources, and the like), as well as assisting its members, including non-technical members, with templates that they do not need to define. Further still, in an alternative to defining a library of templates that may be used, the IT administrator could establish a particular template that must be used by members of the organization (based on the conditions of the user-defined template.)

Of course, in this (and other instances), a "user-defined template" should be viewed as a non-predefined template, i.e., not the default template. For example, a utility company may wish to provide convenient response options to its customers by offering one or more "user-defined" templates that are tailored (and, potentially, could be further refined or modified by a customer) to a bill notification that the utility company sends. Further, an IT administrator may commission or hire others to generate non-default templates that will be used within the organization. Accordingly, the term "user-defined template," "user-defined notification template," and/or "user-defined presentation template" may be further interpreted as a non-default template.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer implemented method for presenting an email message to a user on a computing device, the method comprising each of the following as implemented on a computing device comprising at least a processor and a memory:
   providing a template store, the template store including one or more user defined templates for presenting content of an email message, including a first user defined template defined by a first user;
   receiving a signal of the first user to view a first email message;
   determining that the first user defined template in the template store is applicable to the first email message;
   upon determining the first user defined template is applicable to the first email message, generating a presentation of the first email message according to the first user defined template, wherein the presentation of the first email message includes a user actionable control to conduct at least one user action based on the content of the email message and defined by the first user-defined template, and includes at least some content of the first email message and excludes at least some content of the first email message; and
   presenting the generated presentation of the first email message on the computing device.

2. The computer implemented method of claim 1:
   wherein each of the one or more user defined templates in the template store identifies a basis to which the user defined template of the one or more user defined templates of the template store is applicable to a corresponding email message; and
   wherein determining the first user defined template is applicable to the received email message comprises determining the basis of the first user defined template is applicable to the received email message.

3. The computer implemented method of claim 2, wherein the first user defined template identifies an associated condition, the associated condition not comprising the basis to which the first user defined template is applicable to a corresponding email message.

4. The computer implemented method of claim 3, wherein determining that the first user defined template is applicable to the received email message further comprises determining the associated condition of the first user defined template is satisfied by the received email message.

5. The computer implemented method of claim 3, wherein the first user defined template identifies an associated user action that a user can selectively carry out with regard to the received email message.

6. The computer implemented method of claim 5, wherein generating the presentation of the first email message corresponding to the received email message according to the first user defined template further comprises generating the presentation corresponding to the received email message according to the first user defined template that includes the user actionable control by which a user can selectively initiate the associated user action.

7. The computer implemented method of claim 6 further comprising:
   receiving an indication of a user activation of the user actionable control; and
   initiating the associated user action on the computing device.

8. The computer implemented method of claim 3 further comprising upon determining the first user defined template is not applicable to the first email message, generating a presentation of the first email message corresponding to the received notification signal according to a default template.

9. The computer implemented method of claim 3, wherein the template store comprises a plurality of user defined templates, including the first user defined template.

10. The computer implemented method of claim 9, wherein the plurality of user defined templates in the template store includes at least one user defined template obtained from a third party.

11. A computer readable medium bearing computer executable instructions which, when executed on a computing system comprising at least a processor, carry out a method for presenting an email message to a user, the method comprising:
    providing a template store, the template store including one or more user defined templates for presenting content of an email message;
    receiving a signal to view a first email message;
    determining that a first user defined template in the template store is applicable to the first email message;
    upon determining the first user defined template is applicable to the first email message, generating a presentation of the first email according to the first user defined template, wherein the presentation of the first email includes a user actionable control to conduct at least one user action based on the content of the email message and defined by the first user-defined template, and includes at least some content of the first email message and excludes at least some content of the first email message; and
    presenting the presentation of the first email on the computing device.

12. The computer readable medium of claim 11:
    wherein each of the one or more user defined templates in the template store identifies a basis to which the user defined notification template of the one or more user defined templates of the template store is applicable to a corresponding signal; and
    wherein determining the first user defined template is applicable to the received first email message comprises determining the basis of the first user defined template is applicable to the received signal.

13. The computer readable medium of claim 12:
    wherein each user defined template of the one or more user defined templates in the template store identifies a presentation format for generating the corresponding email message on the computing device; and
    the presentation of the first email message according to the first user defined template comprises generating the presentation according to the identified presentation format of the first user defined template.

14. The computer readable medium of claim 12:
wherein the first user defined template identifies an associated condition, the associated condition not comprising the basis, to which the first user defined template is applicable to a corresponding received email; and
wherein determining the first user defined template is applicable to the received first email message further comprises determining the associated condition of the first user defined template is satisfied by the received first email message.

15. The computer readable medium of claim 12:
wherein the first user defined template identifies an associated user action that a user can selectively carry out with regard to the first email message; and
presentation of the first email message according to the first user defined template further comprises generating the presentation of the first email message according to the first user defined template that includes the user actionable control by which the user can selectively initiate the associated user action.

16. The computer readable medium of claim 15, wherein the method further comprises:
receiving an indication of a user activation of the user actionable control; and
initiating the associated user action on the computing device.

17. A computing device for presenting an email message in response to receiving a first email, the computing device comprising a processor and a memory, wherein the processor executes instructions stored in the memory as part of or in conjunction with additional components to present the first email message, the additional components comprising:
one or more notification sources, each notification source configured to detect a triggering condition corresponding to a condition for which a presentation of an email is to be generated, and upon detecting a triggering condition, is configured to generate and issue a notification signal;
a notification system configured to receive an issued notification signal, and upon receiving the notification signal:
determine a first user defined notification template in a template store is applicable to the notification signal; and
upon determining that the first user defined notification template is applicable to the notification signal, generating a presentation of the first email according to the first user defined template, wherein the presentation of the first email includes a user actionable control to conduct at least one user action based on a content of the email message and defined by the first user defined notification template, and the presentation of the first email includes at least some content of the first email message and excludes at least some content of the first email message, and providing the first user defined notification template and the notification signal to a notification builder; and
a notification builder configured to obtain a user defined notification template and a notification signal from the notification system, and generate a notification corresponding to the received notification signal according to the first user defined notification template, wherein the notification includes one or more user actionable hyperlinks, and to present the generated notification on the computing device via an input/output (I/O) system of the computing device.

18. The computing device of claim 17, wherein the template store stores one or more user defined notification templates, including the first user defined notification template, and:
wherein each of the one or more user defined templates in the template store identifies a notification basis to which the user defined notification template of the one or more user defined notification templates of the template store is applicable to a corresponding notification signal; and
wherein determining the first user defined notification template is applicable to the received notification signal comprises determining the notification basis of the first user defined notification template is applicable to the received notification signal.

19. The computing device of claim 18:
wherein each user defined notification template of the one or more user defined notification templates in the template store identifies a presentation format for generating the notification signal on the computing device; and
wherein the notification builder is configured to generate a notification corresponding to the received notification signal according to the first user defined notification template, and further according to the identified presentation format of the first user defined notification template.

* * * * *